US012607809B2

(12) United States Patent
Seneviratne et al.

(10) Patent No.: US 12,607,809 B2
(45) Date of Patent: Apr. 21, 2026

(54) OPTICAL WAVEGUIDE EDGE COUPLING WITHIN A SUBSTRATE

(71) Applicant: Intel Corporation, Santa Clara, CA (US)

(72) Inventors: Dilan Seneviratne, Chandler, AZ (US); Whitney Bryks, Tempe, AZ (US); Ala Omer, Phoenix, AZ (US); Jieying Kong, Chandler, AZ (US); Sarah Blythe, Phoenix, AZ (US); Bainye Francoise Angoua, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 17/482,384

(22) Filed: Sep. 22, 2021

(65) Prior Publication Data

US 2023/0090863 A1 Mar. 23, 2023

(51) Int. Cl.
G02B 6/42 (2006.01)
G02B 6/12 (2006.01)

(52) U.S. Cl.
CPC ............. G02B 6/4203 (2013.01); G02B 6/12 (2013.01); *G02B 2006/12061* (2013.01); *G02B 2006/12147* (2013.01); *G02B 2006/12171* (2013.01)

(58) Field of Classification Search
CPC ........... G02B 6/42; G02B 6/4203; G02B 6/12
See application file for complete search history.

(56) References Cited

U.S. PATENT DOCUMENTS

| | | | |
|---|---|---|---|
| 10,598,860 B2 | 3/2020 | Ramachandran | |
| 2009/0003761 A1 | 1/2009 | Matsuoka | |
| 2016/0291265 A1 | 10/2016 | Kinghorn | |
| 2016/0291269 A1 | 10/2016 | Klein | |
| 2017/0139146 A1 | 5/2017 | Novack et al. | |
| 2018/0081118 A1 | 3/2018 | Klamkin | |
| 2019/0302379 A1 | 10/2019 | Raghunathan | |
| 2020/0220329 A1* | 7/2020 | Siriani | ..................... H01S 5/021 |
| 2021/0091529 A1* | 3/2021 | Siriani | ..................... G02B 6/12 |
| 2023/0134378 A1* | 5/2023 | Fukuzaki | ................ H01S 5/022 |
| | | | 385/14 |

FOREIGN PATENT DOCUMENTS

TW I710081 11/2020

OTHER PUBLICATIONS

International Search Report and Written Opinion for International Patent Application No. PCT/US2022/038011 mailed Nov. 11, 2022, 12 pgs.

(Continued)

*Primary Examiner* — Tina Wong

(74) *Attorney, Agent, or Firm* — Schwabe, Williamson & Wyatt, P.C.

(57) ABSTRACT

Embodiments described herein may be related to apparatuses, processes, and techniques directed to dense integration of PICs in a substrate using an optical fanout structure that includes waveguides formed within a substrate to optically couple with the PICs at an edge of the substrate. One or more PICs may then be electrically with dies such as processor dies or memory dies. The one or more PICs may be located within a cavity in the substrate. The substrate may be made of glass or silicon. Other embodiments may be described and/or claimed.

24 Claims, 10 Drawing Sheets

(56)          References Cited

OTHER PUBLICATIONS

International Preliminary Report on Patentability for International
Patent Application No. PCT/US2022/038011 mailed Apr. 4, 2024,
9 pgs.
Search Report from European Patent Application No. EP 22873356.
4, mailed Jul. 7, 2025, 10 pgs.

\* cited by examiner

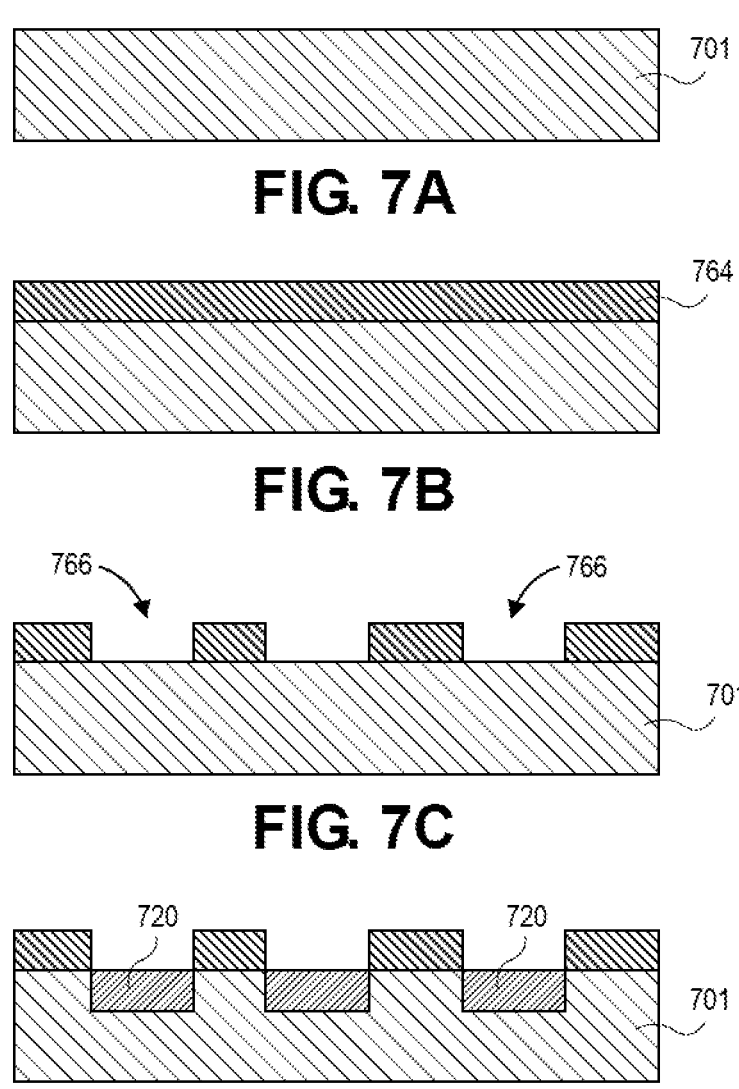
701
FIG. 7A
764
FIG. 7B
766          766
701
FIG. 7C
720          720
701
FIG. 7D
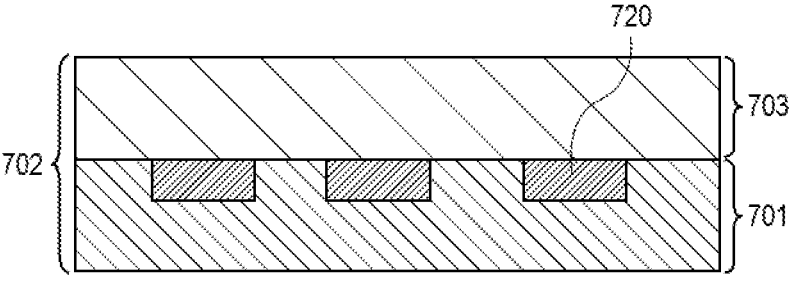
720
703
702
701
402
FIG. 7E

OPTICAL WAVEGUIDE EDGE COUPLING WITHIN A SUBSTRATE

FIELD

Embodiments of the present disclosure generally relate to the field of semiconductor packaging, and in particular optically coupling photonic integrated circuits (PIC).

BACKGROUND

Continued growth in computing and mobile devices will continue to increase the demand for increased bandwidth and speed between dies within semiconductor packages.

BRIEF DESCRIPTION OF THE DRAWINGS

FIGS. 7A-7E illustrate stages in a manufacturing process for forming optical waveguides within a glass substrate, in accordance with various embodiments.

DETAILED DESCRIPTION

Figure 1:
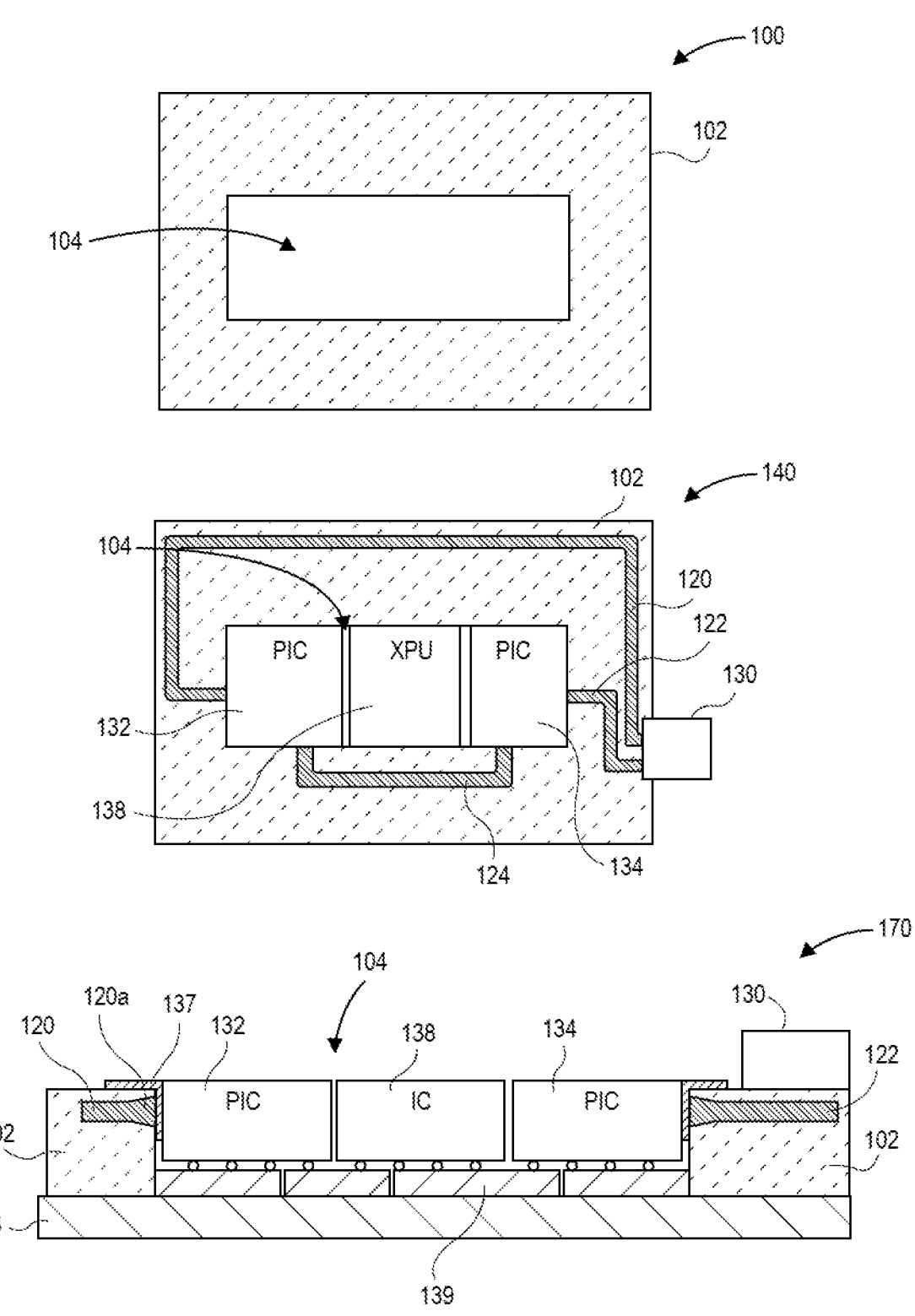
FIG. 1 illustrates a top down view and a cross section side view of a package that includes a substrate that has a cavity, with optical waveguides within the substrate optically coupled with dies at an edge of the substrate within the cavity, in accordance with various embodiments.

Embodiments described herein may be related to apparatuses, processes, and techniques for enabling dense integration of PICs in a substrate adjacent to central processing units (CPU), logic dies, processing dies, or other dies, which herein may be collectively referred to as XPUs, through the use of an optical fanout. In embodiments, the optical fanout may include waveguides formed within the substrate to optically couple with the PICs. The PICs may then be electrically coupled with XPUs. In embodiments, the substrate may be referred to as an optical interposer with integrated optical waveguides. In embodiments, the substrate may be made of, but not limited to, glass or silicon.

In embodiments, depending on the design of the substrate, optical waveguides, and PICs, such an optical fanout architecture may enable in excess of one petabyte per second (Pb/s) bandwidth on the package. Embodiments of this architecture may enable dense integration of PICs within a package and facilitate low latency, by reducing distances between PICs and XPUs within the package. In embodiments, passive alignment of components within the package may be enabled due to a design of a coupling mechanism within the substrate to widen the waveguide for optical coupling to the PICs.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

FIG. 1 illustrates a top down view and a cross section side view of a package that includes a substrate that has a cavity, with optical waveguides within the substrate optically coupled with dies at an edge of the substrate within the cavity, in accordance with various embodiments. Diagram 100 shows a top-down view of a substrate 102 with a cavity 104 formed within the substrate 102. The substrate 102 may also be referred to as an interposer. In embodiments, the substrate 102 may be a glass substrate, a silicon substrate, or a substrate of some other composition into which optical waveguides may be formed, as discussed further below. A thickness of the substrate 102 may vary based upon desired characteristics of the package, which may include rigidity of the package, the number of layers of optical waveguides to be formed within the substrate 102, and/or the dimensions of the PICs and XPUs to be coupled with the PICS.

Package 140 shows a top-down view of various waveguides 120, 122, 124 that may be formed within the substrate 102 using techniques and processes as described below. These processes may vary depending upon the composition of the substrate 102. An optical connector 130 may be coupled with an edge of the substrate 102 and may be optically coupled with optical waveguides 120, 122. In embodiments, the optical connector 130 may be used to bridge optical signals between the package 140 and other devices (not shown) outside of package 140.

A first PIC 132 may be optically coupled with optical waveguide 120, and a second PIC 134 may be optically coupled with optical waveguide 122. In embodiments, PIC 132 and PIC 134 are located within the cavity 104 of substrate 102. The PICs 132, 134 may be of various sizes, and may include a plurality of optical couplings (not shown) to accommodate additional optical waveguides. In embodiments, the first PIC 132 may also be optically coupled with the second PIC 134 using optical waveguide 124. The optical waveguide 124 may provide a high speed communication route between the first PIC 132 and the second PIC 134.

In embodiments, an XPU, also placed within the cavity 104, may be electrically coupled with the first PIC 132 and the second PIC 134. Thus, in the embodiment as shown, the XPU 138 is able to receive high-speed signals via two distinct optical paths, optical waveguide 120 and optical waveguide 122. As discussed further below, different architecture embodiments can greatly increase bandwidth to the XPU 138.

In embodiments, a dimension of the cavity 104, dimension and positioning of the PICs 132, 134, dimension and positioning XPU 138, and positioning and design of waveguides 120, 122 may enable passive alignment during manufacturing of the package 140.

Package 170 is a cross section side view of package 140, and includes substrate 102 and cavity 104 within substrate 102, first PIC 132 and second PIC 134, as well as XPU 138 within the cavity 104. In embodiments, an interconnection layer 139 may be used to electrically couple the first PIC 132 with the XPU 138, and to electrically couple the second PIC 134 with the XPU 138. In embodiments, the interconnection layer 139 may not be present, and electrical interconnection may occur through substrate 103.

Waveguide 120 may be optically coupled with the first PIC 132 as shown. In embodiments, an optical underfill 137 may be dispensed between an end 120a of the waveguide 120 and an optical component (not shown) of the PIC 132. In embodiments, the optical underfill 137 may be selected based upon matching an index of the optical waveguide 120, and may be used to fill gaps between the end 120a and the PIC 132. In embodiments, the optical connector 130 may be placed on a surface of the substrate 102, and may be optically coupled with the waveguides 120, 122 using an evanescent coupling. In other embodiments, end-fire or butt coupling scheme may be used to optically couple the waveguides 120, 122 and the optical connector 130. Note that these optical couplings may involve wavelength insensitive coupling techniques to enable wave division multiplexing (WDM).

Figure 2:
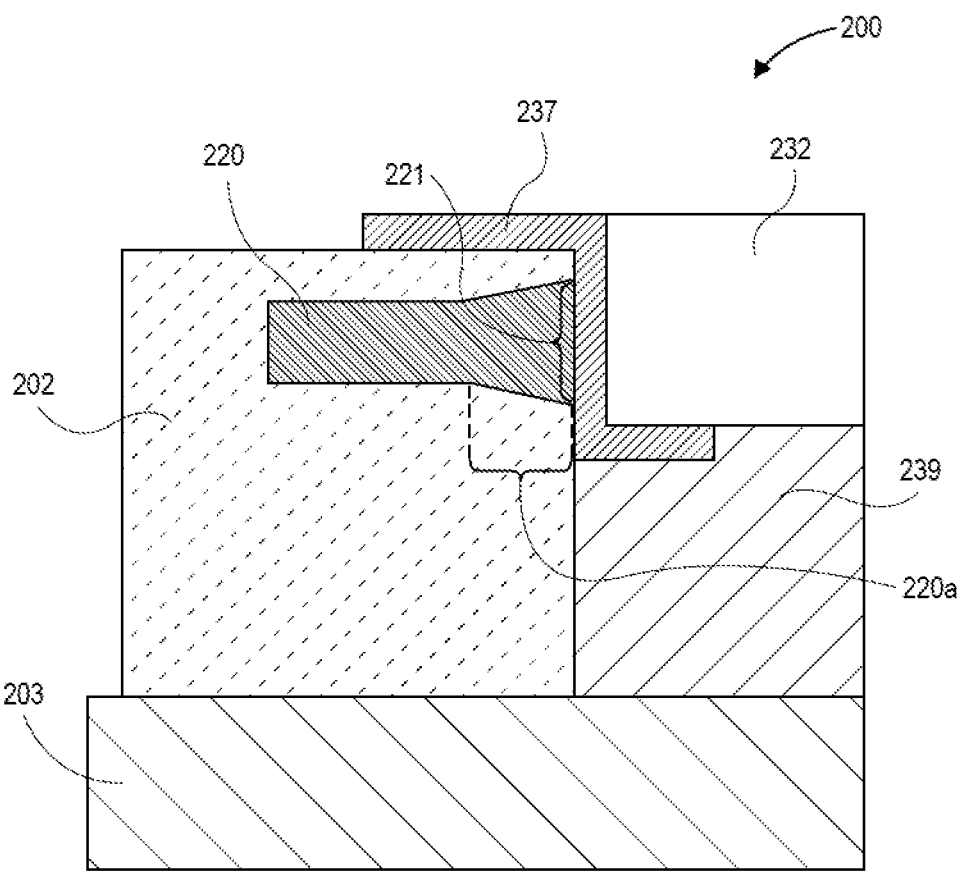
FIG. 2 illustrates a side view of an optical coupling between an optical waveguide within a substrate and a photonics integrated circuit (PIC), in accordance with various embodiments.

FIG. 2 illustrates a side view of an optical coupling between an optical waveguide within a substrate and a photonics integrated circuit (PIC), in accordance with various embodiments. Package portion 200, which may be similar to package 170 of FIG. 1, includes a glass substrate 202 and interconnection layer 239, which both may be coupled to IC substrate 203, which may be similar to glass substrate 102, interconnection layer 139, and IC substrate 103 of FIG. 1.

Optical waveguide 220 may be optically coupled with PIC 232, which may be similar to optical waveguide 120 and PIC 132 of FIG. 1. In embodiments, an optical underfill 237, which may be similar to optical underfill 137 of FIG. 1, may be positioned between the waveguide 220 and the PIC 232. In embodiments, some of the optical underfill 237 may also extend to a side of the substrate 202, as well as underneath a portion of the PIC 232.

An end 220a of the optical waveguide 220 may be optically coupled as an edge coupling with the PIC 232. The end 220a may include a mode expander 221, which in embodiments may taper outward conically, used in conjunction with edge coupling to the PIC 232 in order to reduce sensitivity to misalignment of the PIC 232 with respect to the waveguide 220.

Figure 3:
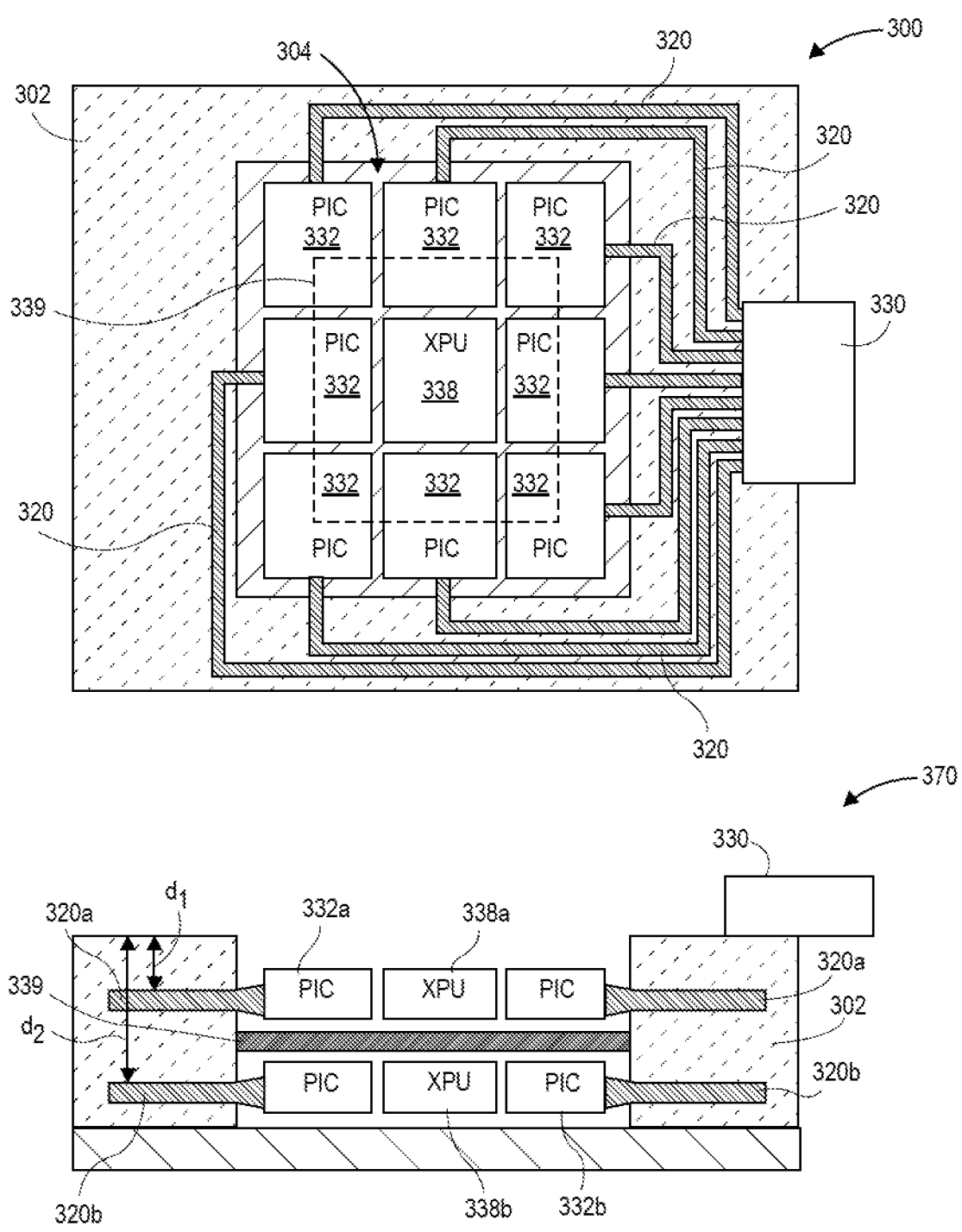
FIG. 3 illustrates a top down view and a cross section side view of a package that includes a substrate that has a cavity, with optical waveguides at multiple levels within the substrate optically coupled with dies at an edge of the substrate within the cavity, in accordance with various embodiments.

FIG. 3 illustrates a top down view and a cross section side view of a package that includes a substrate that has a cavity, with optical waveguides at multiple levels within the substrate optically coupled with dies at an edge of the substrate within the cavity, in accordance with various embodiments. Package 300 shows a top-down view that includes a substrate 302, cavity 304, optical connector 330, and XPU 338 positioned within the cavity 304, which may be similar to substrate 102, cavity 104, optical connector 130, and XPU 138 of FIG. 1. Multiple PIC 332, which may be similar to PIC 132 or PIC 134 of FIG. 1, are optically coupled with the optical connector 330 via waveguides 320.

In embodiments, an interconnection layer 339, which may be similar to interconnection layer of 139 of FIG. 1, may electrically couple one or more of the PICS 332 with the XPU 338, or with other PICS 332. Note that, in embodiments, the XPU 338 may include multiple XPU components or other circuitry.

Package 370 shows a cross-section side view of package 300, where the interconnection layer 339 is positioned below a first layer that includes PICS 332a, which may be similar to PICS 332 of package 300, optically coupled with optical waveguides 320a located a first depth d1 within substrate 302, with the PICS 332a electrically coupled with the XPU 338a. Similarly, below the interconnection layer 339 is a second layer that includes PICS 332*b*, which may be similar to PICs 332 of package 300, optically coupled with optical waveguides 320*b* located a first depth d2 within substrate 302, with the PICs 332*a* electrically coupled with the XPU 338*b*. Thus, in this configuration XPUs 338*a*, 338*b* may be electrically coupled with 16 PICs 320*a*, 320*b*. In other embodiments other numbers of PICs 320*a*, 320*b* may be used. In embodiments, the interconnection layer 339 may include circuitry, as well as bridges such as an embedded multi-die interconnect bridge (EMIB) (not shown).

Figures 4, 5:
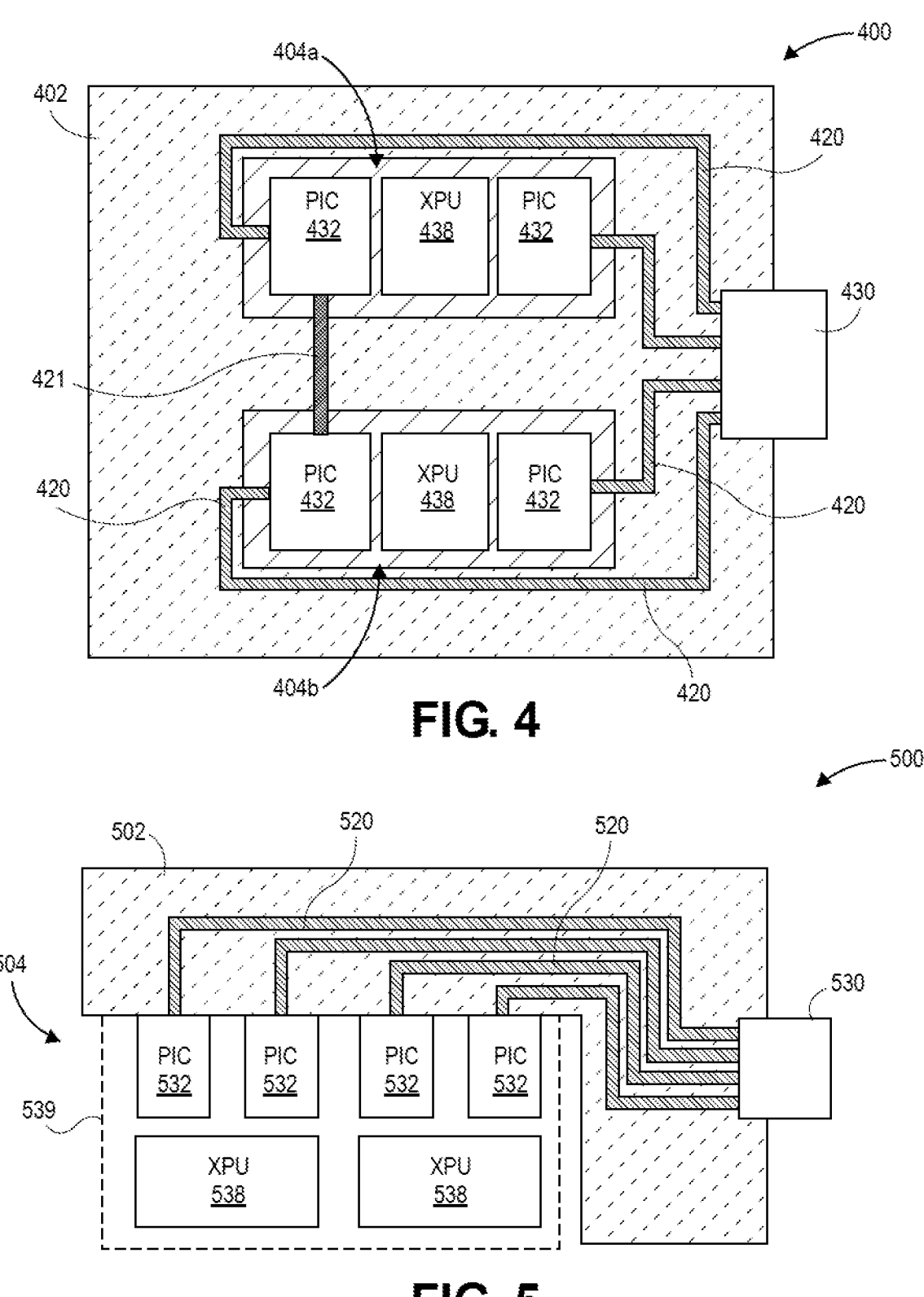
FIG. 4 illustrates a top down view of the package that includes a substrate that has two cavities, with optical waveguides within the substrate optically coupled with dies at an edge of the substrate within the first cavity and with dies at an edge of the second cavity, in accordance with various embodiments.
FIG. 5 illustrates a top down view of a package that includes a substrate with optical waveguides within the substrate optically coupled with dies at an edge of the substrate, in accordance with various embodiments.

FIG. 4 illustrates a top down view of the package that includes a substrate that has two cavities, with optical waveguides within the substrate optically coupled with dies at an edge of the substrate within the first cavity and with dies at an edge of the second cavity, in accordance with various embodiments. Package 400 shows a substrate 402 with a plurality of optical waveguides 420 that are optically coupled with an optical coupler 430, which may be similar to substrate 102, optical waveguides 120, 122, and optical coupler 130 of FIG. 1.

Package 400 includes two cavities 404*a*, 404*b*, which may be similar to cavity 104 of FIG. 1, into which PICs 432 are placed and optically coupled with the optical waveguides 420. XPUs 438, which may be similar to XPU 338 of FIG. 3, may be electrically coupled with the respective PICs 432 within each cavity 404*a*, 404*b*. In addition, one or more optical waveguides 421 may be used to optically couple PICs 432 that are located in different cavities 404*a*, 404*b*.

FIG. 5 illustrates a top down view of a package that includes a substrate with optical waveguides within the substrate optically coupled with dies at an edge of the substrate, in accordance with various embodiments. Package 500 includes a substrate 502, optical waveguides 520, optical connector 530, PICs 532, XPUs 538, and interconnection layer 539 which may be similar to substrate 102, optical waveguides 120, 122, optical connector 130, PICs 132, XPU 138, and interconnection layer 139 of FIG. 1. In embodiments, the interconnection layer 539 may electrically couple the PICs 532 and the XPUs 538. The PICs 532 may be optically coupled with the optical connector 530 using optical waveguides 520. In this embodiment, a cavity 504 may be formed out of the corner of the substrate 502, into which the PICs 532 and XPUs 538 may be inserted.

It should be noted that the embodiment shown with respect to package 500 is an example of one of many embodiments that may include different configurations of the substrate 502, with various PICs, such as PICs 532, located at one or more edges of the substrate 502, with various optical waveguides such as optical waveguides 520 embedded within the substrate 502. The PICs may be electrically coupled with XPUs, such as XPUs 538, or other circuitry, using an interconnection layer 539. In embodiments, the interconnection layer 539 may be implemented as a high density routing layer, a standard routing layer, or as an embedded die such as an EMIB.

Figures 6A, 6B, 6C, 6D:
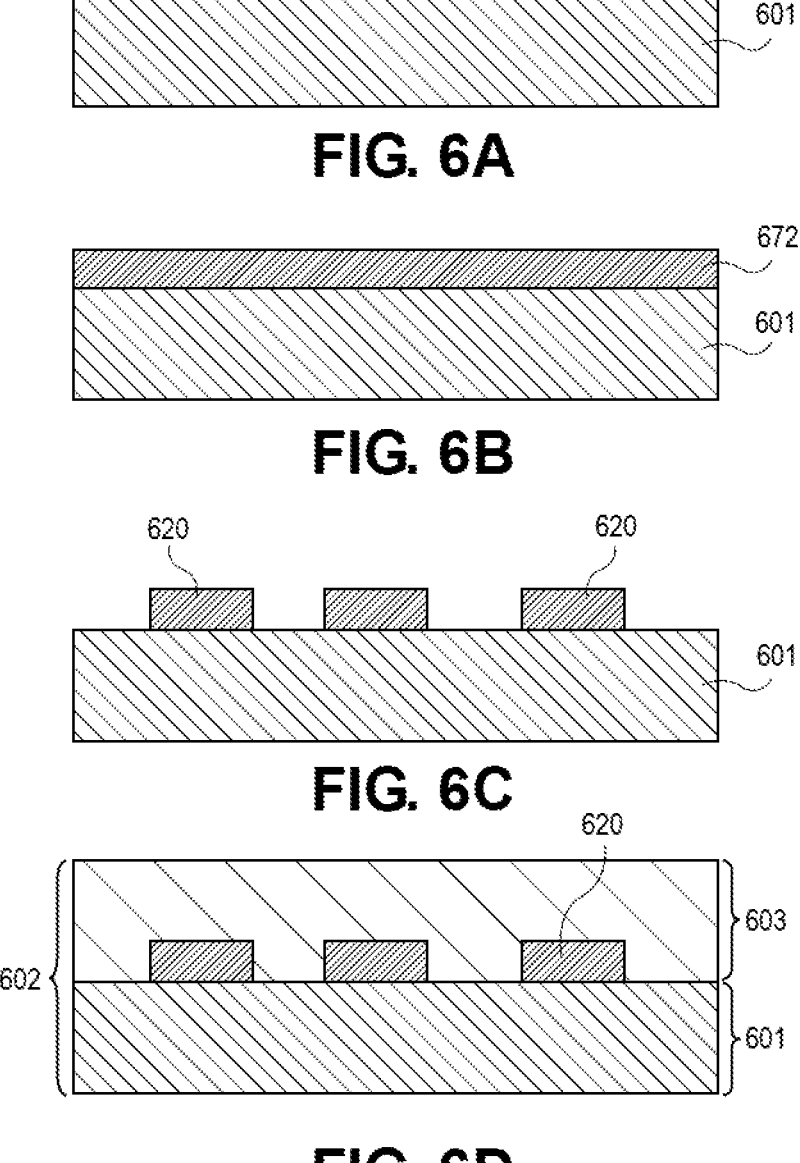
FIGS. 6A-6D illustrate stages in a manufacturing process for forming optical waveguides within the substrate, in accordance with various embodiments

FIGS. 6A-6D illustrate stages in a manufacturing process for forming optical waveguides within the substrate, in accordance with various embodiments. FIG. 6A shows a cross section side view of a stage in the manufacturing process where a first substrate layer 601, which may be similar to substrate 102 of FIG. 1, may be identified. In embodiments, the first substrate 601 layer may be a glass substrate, a silicon substrate, or a substrate made of some other material.

FIG. 6B shows a cross section side view of a stage in the manufacturing process where a waveguide layer 672 is deposited on a surface of the first substrate layer 601. In embodiments, the deposited waveguide layer 672 may include SiNx, doped SiOx, and the like. In embodiments, waveguide layer 672 may be formed out of a photo-patternable dielectric.

FIG. 6C shows a cross-section side view of a stage in the manufacturing process where the waveguide layer 672 is subjected to a patterning process, producing individual waveguides 620, which may be similar to waveguides 120, 122 of FIG. 1, on top of the first substrate layer 601.

FIG. 6D shows a cross-section side view of the stage in the manufacturing process where a second to substrate layer 603 is deposited on top of the first substrate layer 601 and the waveguides 620. In embodiments, this deposition may be referred to as applying an overclad layer 603. The result is a formation of a substrate 602, which may be similar to substrate 102 of FIG. 1 into which the optical waveguides 620 are embedded.

FIGS. 7A-7E illustrate stages in a manufacturing process for forming optical waveguides within a glass substrate, in accordance with various embodiments. FIG. 7A shows a cross section side view of a stage in the manufacturing process where a first glass substrate layer 701, which may be similar to substrate 102 of FIG. 1, may be identified.

FIG. 7B shows a cross section side view of a stage in the manufacturing process where a mask layer 764 is deposited on a surface of the first glass substrate layer 701. In embodiments, the deposited mask layer 764 may include a metal such as copper, nickel, titanium, chromium, or aluminum.

FIG. 7C shows a cross-section side view of a stage in the manufacturing process where the mask layer 764 is patterned to create exposure areas 766 above the surface of the first glass substrate layer 701.

FIG. 7D shows a cross-section side view of a stage in the manufacturing process where an ion implant, or ion exchange process is applied to the first glass substrate layer 701, where waveguides 720, which may be similar to waveguides 120 FIG. 1, are created by using ions passing through the exposure areas 766 to change a refractive index of the glass in the first glass substrate layer 701.

FIG. 7E shows a cross-section side view of the stage in the manufacturing process where the mask layer 764 is stripped, and a second substrate layer 703 is deposited on top of the first substrate layer 701 and the waveguides 720. In embodiments, this deposition may be referred to as applying an overclad layer 703. The result is a formation of a substrate 702, which may be similar to substrate 102 of FIG. 1 into which the optical waveguides 720 are embedded.

Figure 8A:
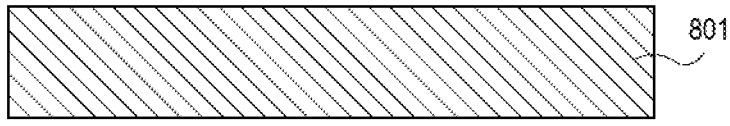
FIGS. 8A-8C illustrate stages in another manufacturing process for forming optical waveguides within a glass substrate, in accordance with various embodiments.
Figure 8B:
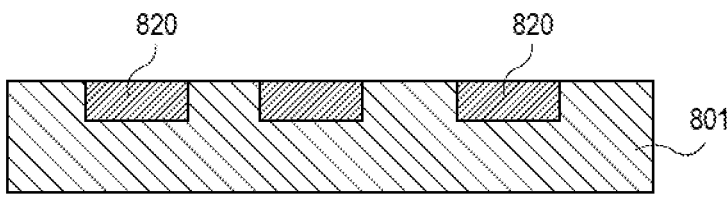
Figure 8C:
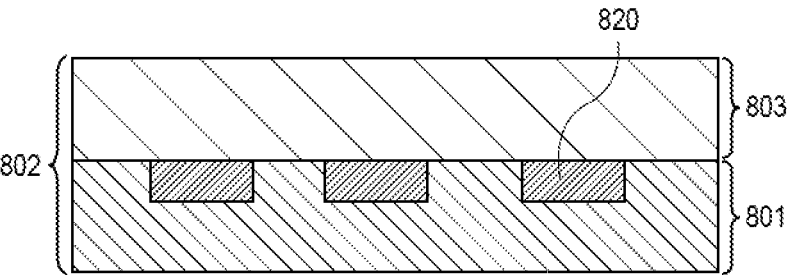

FIGS. 8A-8C illustrate stages in another manufacturing process for forming optical waveguides within a glass substrate, in accordance with various embodiments. FIG. 8A shows a cross section side view of a stage in the manufacturing process where a first glass substrate layer 801, which may be similar to substrate 102 of FIG. 1, may be identified.

FIG. 8B shows a cross section side view of a stage in the manufacturing process where a laser direct writing process is applied to a surface of the first glass substrate layer 801 to form waveguides 820.

FIG. 8C shows a cross-section side view of the stage in the manufacturing process where and a second substrate layer 803 is deposited on top of the first substrate layer 801 and the waveguides 820. The result is a formation of a substrate 802, which may be similar to substrate 102 of FIG. 1 into which the optical waveguides 820 are embedded.

In embodiments, it should be appreciated that other processes may be used to create optical waveguides at the top of a surface of a substrate. For example, a trench may be formed within a surface of a glass substrate layer, such as first glass substrate layer 801, using techniques described below with respect to FIG. 9. Once the trench is formed, optical waveguide material, such as the optical waveguide material of waveguide layer 672 of FIG. 6B, may be deposited within the trench. Subsequent manufacturing stages, that may be similar to manufacturing stages described within FIG. 6D, FIG. 7E, and/or FIG. 8 above may be applied to embed the deposited optical waveguide material into the substrate.

Figure 9:
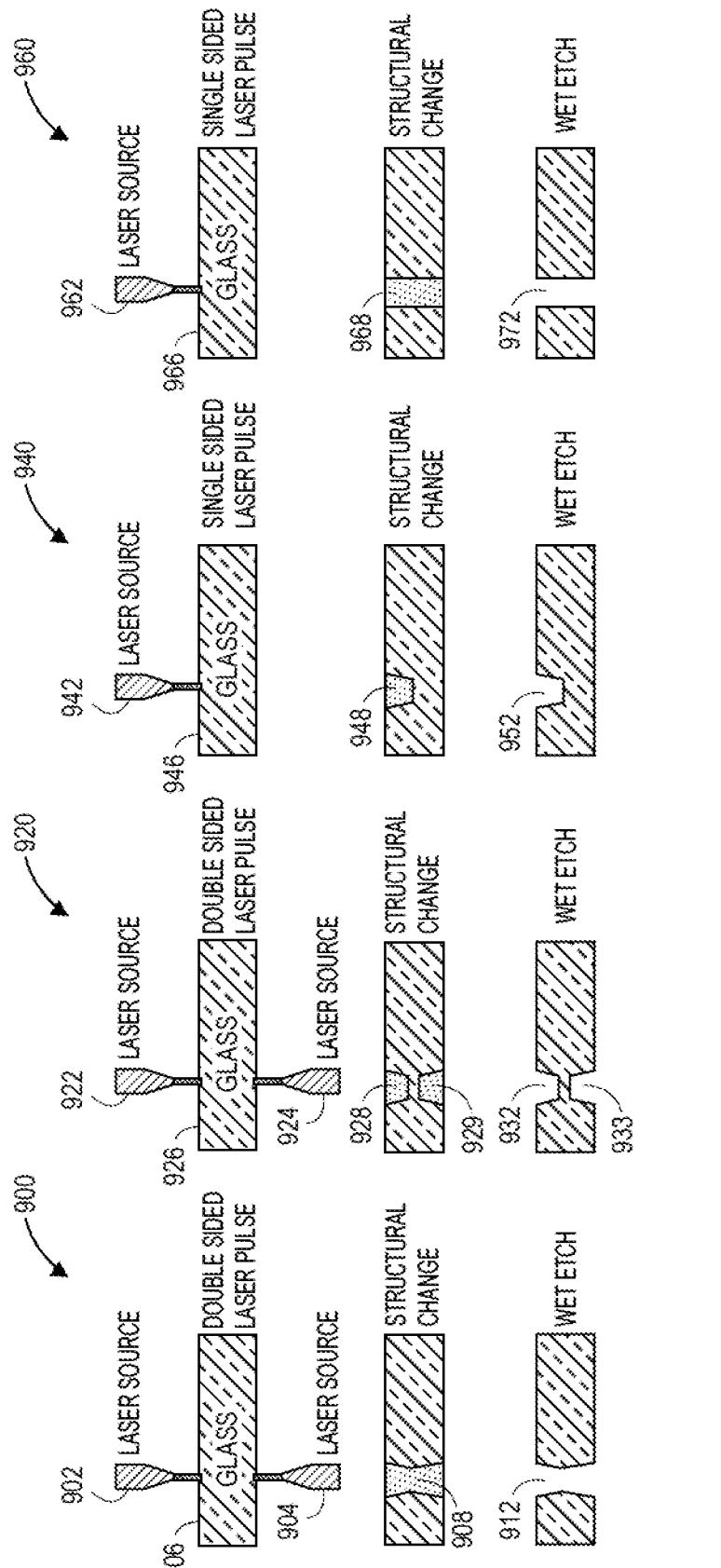
FIG. 9 illustrates multiple examples of laser-assisted etching of glass interconnects processes, in accordance with embodiments

FIG. 9 illustrates multiple examples of laser-assisted etching of glass interconnects processes (which may be referred to as "LEGIT" herein), in accordance with embodiments. One use of the LEGIT technique is to provide an alternative substrate core material to the legacy copper clad laminate (CCL) core used in semiconductor packages used to implement products such as servers, graphics, clients, 5G, and the like. By using laser-assisted etching, crack free, high density via drills, hollow shapes may be formed into a glass substrate. In embodiments, different process parameters may be adjusted to achieve drills of various shapes and depths, thus opening the door for innovative devices, architectures, processes, and designs in glass. Embodiments, such as the bridge discussed herein, may also take advantage of these techniques.

Diagram 900 shows a high-level process flow for a through via and blind via (or trench) in a microelectronic package substrate (e.g. glass) using LEGIT to create a through via or a blind via. A resulting volume/shape of glass with laser-induced morphology change that can then be selectively etched to create a trench, a through hole or a void that can be filled with conductive material. A through via 912 is created by laser pulses from two laser sources 902, 904 on opposite sides of a glass wafer 906. As used herein, a through drill and a through via refers to when the drill or the via starts on one side of the glass/substrate and ends on the other side. A blind drill and a blind via refers to when the drill or the via starts on the surface of the substrate and stops half way inside the substrate. In embodiments, the laser pulses from the two laser sources 902, 904 are applied perpendicularly to the glass wafer 906 to induce a morphological change 908, which may also be referred to as a structural change, in the glass that encounters the laser pulses. This morphological change 908 includes changes in the molecular structure of the glass to make it easier to etch out (remove a portion of the glass). In embodiments, a wet etch process may be used.

Diagram 920 shows a high level process flow for a double blind shape. A double blind shape 932, 933 may be created by laser pulses from two laser sources 922, 924, which may be similar to laser sources 902, 904, that are on opposite sides of the glass wafer 926, which may be similar to glass wafer 906. In this example, adjustments may be made in the laser pulse energy and/or the laser pulse exposure time from the two laser sources 922, 924. As a result, morphological changes 928, 929 in the glass 926 may result, with these changes making it easier to etch out portions of the glass. In embodiments, a wet etch process may be used.

Diagram 940 shows a high level process flow for a single-blind shape, which may also be referred to as a trench. In this example, a single laser source 942 delivers a laser pulse to the glass wafer 946 to create a morphological change 948 in the glass 946. As described above, these morphological changes make it easier to etch out a portion of the glass 952. In embodiments, a wet etch process may be used.

Diagram 960 shows a high level process flow for a through via shape. In this example, a single laser source 962 applies a laser pulse to the glass 966 to create a morphological change 968 in the glass 966, with the change making it easier to etch out a portion of the glass 972. As shown here, the laser pulse energy and/or laser pulse exposure time from the laser source 962 has been adjusted to create an etched out portion 972 that extends entirely through the glass 966.

With respect to FIG. 9, although embodiments show laser sources 902, 904, 922, 924, 942, 962 as perpendicular to a surface of the glass 906, 926, 946, 966, in embodiments, the laser sources may be positioned at an angle to the surface of the glass, with pulse energy and/or pulse exposure time variations in order to cause a diagonal via or a trench, or to shape the via, such as 912, 972, for example to make it cylindrical, tapered, or include some other feature. In addition, varying the glass type may also cause different features within a via or a trench as the etching of glass is strongly dependent on the chemical composition of the glass.

In embodiments using the process described with respect to FIG. 9, through hole vias 912, 972 may be created that are less than 10 μm in diameter, and may have an aspect ratio of 40:1 to 50:1. As a result, a far higher density of vias may be placed within the glass and be placed closer to each other at a fine pitch. In embodiments, this pitch may be 50 μm or less. After creating the vias or trenches, a metallization process may be applied in order to create a conductive pathway through the vias or trenches, for example a plated through hole (PTH). Using these techniques, finer pitch vias may result in better signaling, allowing more I/O signals to be routed through the glass wafer and to other coupled components such as a substrate.

Figure 10:
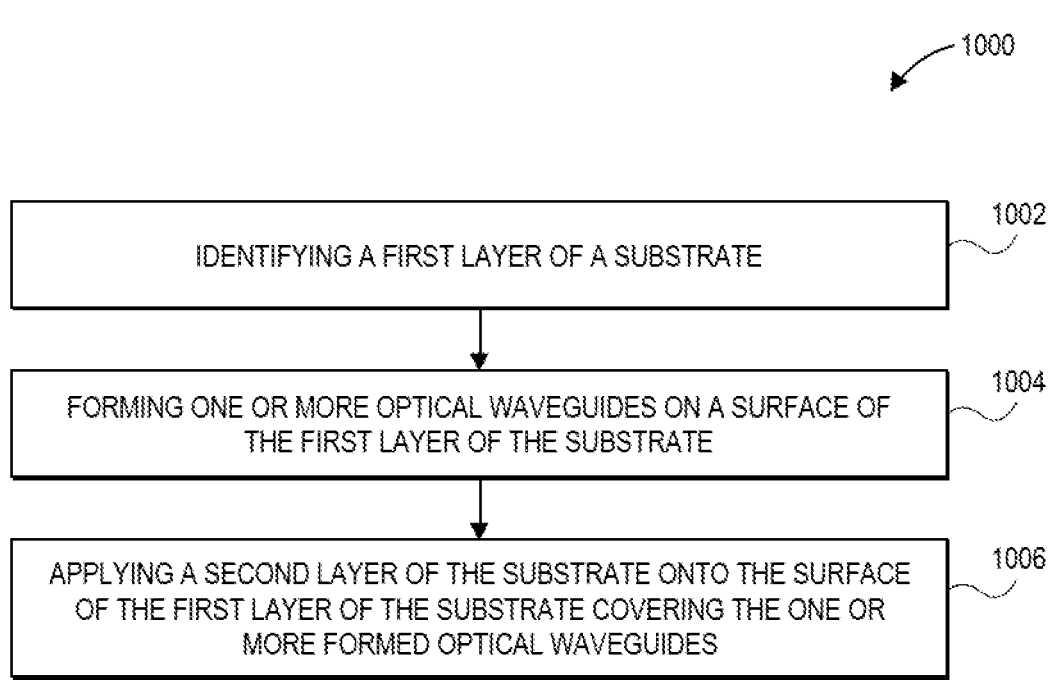
FIG. 10 illustrates an example of a process for forming optical waveguides within a substrate, in accordance with various embodiments.

FIG. 10 illustrates an example of a process for forming optical waveguides within a substrate, in accordance with various embodiments. Process 1000 may be performed using the techniques, methods, systems, and/or apparatuses described herein and in particular with respect to FIGS. 1-9.

At block 1002, the process may include identifying a first layer of a substrate. In embodiments, the substrate may be similar to substrate 102 of FIG. 1, substrate 202 of FIG. 2, substrate 302 of FIG. 3, substrate 402 of FIG. 4, substrate 502 of FIG. 5, first substrate layer 601 of FIG. 6A, first glass substrate layer 701 of FIG. 7A, or first glass substrate layer 801 of FIG. 8A.

At block 1004, the process may further include forming one or more optical waveguides on a surface of the first layer of the substrate. In embodiments, forming one or more optical waveguides may be similar to the process stages shown and described with respect to FIGS. 6A-8C.

At block 1006, the process may further include applying a second layer of the substrate onto the surface of the first layer of the substrate covering the one or more formed optical waveguides. In embodiments, forming one or more optical waveguides may be similar to the process stages shown and described with respect to FIGS. 6A-8C.

Figure 11:
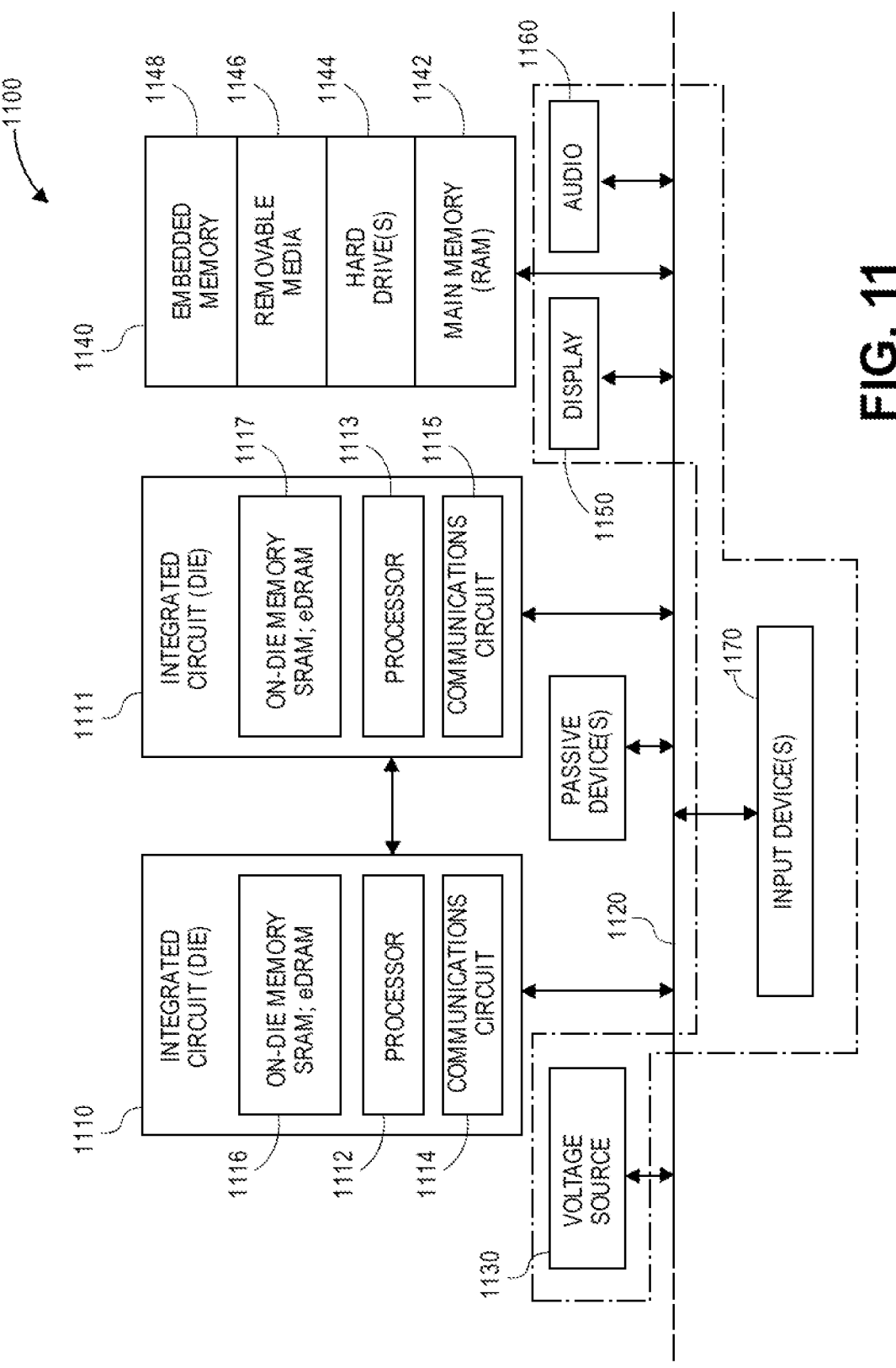
FIG. 11 schematically illustrates a computing device, in accordance with various embodiments.

FIG. 11 is a schematic of a computer system 1100, in accordance with an embodiment of the present invention. The computer system 1100 (also referred to as the electronic system 1100) as depicted can embody optical waveguide edge coupling within a substrate, according to any of the several disclosed embodiments and their equivalents as set forth in this disclosure. The computer system 1100 may be a mobile device such as a netbook computer. The computer system 1100 may be a mobile device such as a wireless smart phone. The computer system 1100 may be a desktop computer. The computer system 1100 may be a hand-held reader. The computer system 1100 may be a server system.

The computer system 1100 may be a supercomputer or high-performance computing system.

In an embodiment, the electronic system 1100 is a computer system that includes a system bus 1120 to electrically couple the various components of the electronic system 1100. The system bus 1120 is a single bus or any combination of busses according to various embodiments. The electronic system 1100 includes a voltage source 1130 that provides power to the integrated circuit 1110. In some embodiments, the voltage source 1130 supplies current to the integrated circuit 1110 through the system bus 1120.

The integrated circuit 1110 is electrically coupled to the system bus 1120 and includes any circuit, or combination of circuits according to an embodiment. In an embodiment, the integrated circuit 1110 includes a processor 1112 that can be of any type. As used herein, the processor 1112 may mean any type of circuit such as, but not limited to, a microprocessor, a microcontroller, a graphics processor, a digital signal processor, or another processor. In an embodiment, the processor 1112 includes, or is coupled with, optical waveguide edge coupling within a substrate, as disclosed herein. In an embodiment, SRAM embodiments are found in memory caches of the processor. Other types of circuits that can be included in the integrated circuit 1110 are a custom circuit or an application-specific integrated circuit (ASIC), such as a communications circuit 1114 for use in wireless devices such as cellular telephones, smart phones, pagers, portable computers, two-way radios, and similar electronic systems, or a communications circuit for servers. In an embodiment, the integrated circuit 1110 includes on-die memory 1116 such as static random-access memory (SRAM). In an embodiment, the integrated circuit 1110 includes embedded on-die memory 1116 such as embedded dynamic random-access memory (eDRAM).

In an embodiment, the integrated circuit 1110 is complemented with a subsequent integrated circuit 1111. Useful embodiments include a dual processor 1113 and a dual communications circuit 1115 and dual on-die memory 1117 such as SRAM. In an embodiment, the dual integrated circuit 1110 includes embedded on-die memory 1117 such as eDRAM.

In an embodiment, the electronic system 1100 also includes an external memory 1140 that in turn may include one or more memory elements suitable to the particular application, such as a main memory 1142 in the form of RAM, one or more hard drives 1144, and/or one or more drives that handle removable media 1146, such as diskettes, compact disks (CDs), digital variable disks (DVDs), flash memory drives, and other removable media known in the art. The external memory 1140 may also be embedded memory 1148 such as the first die in a die stack, according to an embodiment.

In an embodiment, the electronic system 1100 also includes a display device 1150, an audio output 1160. In an embodiment, the electronic system 1100 includes an input device such as a controller 1170 that may be a keyboard, mouse, trackball, game controller, microphone, voice-recognition device, or any other input device that inputs information into the electronic system 1100. In an embodiment, an input device 1170 is a camera. In an embodiment, an input device 1170 is a digital sound recorder. In an embodiment, an input device 1170 is a camera and a digital sound recorder.

As shown herein, the integrated circuit 1110 can be implemented in a number of different embodiments, including a package substrate having optical waveguide edge coupling within a substrate, according to any of the several disclosed embodiments and their equivalents, an electronic system, a computer system, one or more methods of fabricating an integrated circuit, and one or more methods of fabricating an electronic assembly that includes a package substrate having optical waveguide edge coupling within a substrate, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed package substrates having optical waveguide edge coupling within a substrate embodiments and their equivalents. A foundation substrate may be included, as represented by the dashed line of FIG. 11. Passive devices may also be included, as is also depicted in FIG. 11.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 may be an apparatus comprising: a substrate with a first side and a second side opposite the first side; and an optical waveguide within the substrate, the optical waveguide between the first side and the second side of the substrate, wherein an end of the optical waveguide is at an edge of the substrate between the first side and the second side.

Example 2 includes the apparatus of example 1, wherein the substrate is a selected one of: a glass substrate or a silicon substrate.

Example 3 includes the apparatus of example 1, wherein the optical waveguide is a first optical waveguide, and further comprising a second optical waveguide within the substrate, the second optical waveguide between the first side and the second side of the substrate, wherein an end of the second optical waveguide is at the edge of the substrate; and wherein the first optical waveguide is at a first distance from the first side of the substrate, and wherein the second optical waveguide is at a second distance from the first side of the substrate.

Example 4 includes the apparatus of example 3, wherein the first distance and the second distance are a same distance.

Example 5 includes the apparatus of example 3, wherein the first distance and the second distance are different distances.

Example 6 includes the apparatus of example 1, wherein the substrate has a cavity within the substrate extending from the first side of the substrate to the second side of the substrate; and wherein the edge of the substrate is adjacent to the cavity.

Example 7 includes the apparatus of example 6, wherein the end of the optical waveguide is a first end; and further comprising a second end of the optical waveguide opposite the first end; and wherein the second end of the optical waveguide is at an edge of the substrate that is not adjacent to the cavity.

Example 8 includes the apparatus of example 1, wherein the waveguide has a first thickness at the edge of the substrate, and a second thickness below the edge of the substrate, wherein the first thickness is greater than the second thickness.

Example 9 includes the apparatus of example 1, wherein the substrate includes a first layer and a second layer, the first layer extending from the first side glass substrate and the second layer extending from the second side of the substrate; and wherein the optical waveguide is at least partially disposed within the first layer and within the second layer.

Example 10 includes the apparatus of example 1, wherein the optical waveguide is substantially parallel to the first surface or to the second surface of the substrate.

Example 11 includes the apparatus of any one of examples 1-10, wherein a cross-section of the optical waveguide perpendicular to a direction of the optical waveguide has a shape that is a selected one of: a rectangle, or a circle.

Example 12 includes the apparatus of any one of examples 1-11, wherein the optical waveguide includes a selected one or more of: silicon, nitrogen, oxygen, or erbium.

Example 13 is a method comprising: identifying a first layer of a substrate; forming one or more optical waveguides on a surface of the first layer of the substrate; and applying a second layer of the substrate onto the surface of the first layer of the substrate.

Example 14 includes the method of example 13, wherein applying the second layer of the substrate onto the surface of the first layer of the substrate further includes encapsulating the one or more formed optical waveguides within the substrate.

Example 15 includes the method of example 13, wherein forming the one or more optical waveguides on the surface of the first layer of the substrate further includes depositing an optical waveguide material on the surface of the first layer of the substrate.

Example 16 includes the method of example 13, wherein the first layer of the substrate is a glass layer; and wherein forming the one or more optical waveguides on the surface of the first layer of the substrate further includes forming the one or more optical waveguides within one or more volumes of substrate material within the first layer adjacent to the surface of the substrate using a selected one of: implanting ions or laser direct writing.

Example 17 includes the method of example 13, wherein the one or more optical waveguides include glass.

Example 18 includes the method of example 13, wherein applying the second layer of the substrate onto the surface of the first layer of the substrate further includes depositing the second layer.

Example 19 includes the method of any one of examples 13-18, wherein at least two of the one or more optical waveguides are substantially parallel.

Example 20 is a package comprising: a substrate comprising: a first side and a second side opposite the first side; a cavity within the substrate extending from the first side of the substrate to the second side of the substrate; and an optical waveguide within the substrate, the optical waveguide between the first side and the second side of the substrate, wherein an end of the optical waveguide is at an edge of the substrate between the first side and the second side adjacent to the cavity; and a photonic integrated circuit (PIC) optically coupled with the end of the optical waveguide.

Example 21 includes the package of example 20, wherein at least a portion of the PIC is disposed within the cavity of the substrate.

Example 22 includes the package of example 21, further including a die electrically coupled with the PIC, wherein at least a portion of the die is disposed within the cavity of the substrate.

Example 23 includes the package of example 20, wherein the optical waveguide is a first optical waveguide, and wherein the PIC is a first PIC; and further comprising: a second optical waveguide within the substrate, the second optical waveguide between the first side of the second side of the substrate, wherein an end of the optical waveguide is at the edge of the substrate between the first side and the second side adjacent to the cavity; a second PIC optically coupled with the end of the second optical waveguide; a die electrically coupled with the first PIC and the second PIC; and wherein at least a portion of the first PIC, the second PIC, and the die are disposed within the cavity of the substrate.

Example 24 includes the package of example 20, wherein the end of the optical waveguide is a first end; and further comprising a second end of the optical waveguide opposite the first end, the second end is at an edge of the substrate that is not adjacent to the cavity.

Example 25 includes the package of any one of examples 20-24, wherein an optical underfill is disposed between a surface of the end of the optical waveguide and the PIC.

What is claimed is:

1. An apparatus comprising:
a substrate with a first side and a second side opposite the first side;
an optical waveguide within the substrate, the optical waveguide between the first side and the second side of the substrate, wherein an end of the optical waveguide is at an edge of the substrate between the first side and the second side, and wherein the optical waveguide has a first thickness at the edge of the substrate, and a second thickness below the edge of the substrate, wherein the first thickness is greater than the second thickness; and
an optical connector on the first side of the substrate, the optical connector vertically overlapping with the optical waveguide.

2. The apparatus of claim 1, wherein the substrate is a selected one of: a glass substrate or a silicon substrate.

3. The apparatus of claim 1, wherein the optical waveguide is a first optical waveguide, and further comprising a second optical waveguide within the substrate, the second optical waveguide between the first side and the second side of the substrate, wherein an end of the second optical waveguide is at the edge of the substrate; and wherein the first optical waveguide is at a first distance from the first side of the substrate, and wherein the second optical waveguide is at a second distance from the first side of the substrate.

4. The apparatus of claim 3, wherein the first distance and the second distance are a same distance.

5. The apparatus of claim 3, wherein the first distance and the second distance are different distances.

6. The apparatus of claim 1, wherein the substrate has a cavity within the substrate extending from the first side of the substrate to the second side of the substrate; and wherein the edge of the substrate is adjacent to the cavity.

7. The apparatus of claim 6, wherein the end of the optical waveguide is a first end; and further comprising a second end of the optical waveguide opposite the first end; and wherein the second end of the optical waveguide is at an edge of the substrate that is not adjacent to the cavity.

8. The apparatus of claim 1, wherein the substrate includes a first layer and a second layer, the first layer extending from the first side of the substrate and the second layer extending from the second side of the substrate; and wherein the optical waveguide is at least partially disposed within the first layer and within the second layer.

9. The apparatus of claim 1, wherein the optical waveguide is substantially parallel to the first surface or to the second surface of the substrate.

10. The apparatus of claim 1, wherein a cross-section of the optical waveguide perpendicular to a direction of the optical waveguide has a shape that is a selected one of: a rectangle, or a circle.

11. The apparatus of claim 1, wherein the optical waveguide includes a selected one or more of: silicon, nitrogen, oxygen, or erbium.

12. A method comprising:

providing a first layer of a substrate;

forming one or more optical waveguides on a surface of the first layer of the substrate, wherein an end of one of the one or more optical waveguides is at an edge of the substrate, and wherein the one of the one or more optical waveguides has a first thickness at the edge of the substrate, and a second thickness below the edge of the substrate, wherein the first thickness is greater than the second thickness;

applying a second layer of the substrate onto the surface of the first layer of the substrate; and coupling an optical connector to the second layer of the substrate, the optical connector vertically overlapping with the optical waveguide.

13. The method of claim 12, wherein applying the second layer of the substrate onto the surface of the first layer of the substrate further includes encapsulating the one or more formed optical waveguides within the substrate.

14. The method of claim 12, wherein forming the one or more optical waveguides on the surface of the first layer of the substrate further includes depositing an optical waveguide material on the surface of the first layer of the substrate.

15. The method of claim 12, wherein the first layer of the substrate is a glass layer; and wherein forming the one or more optical waveguides on the surface of the first layer of the substrate further includes forming the one or more optical waveguides within one or more volumes of substrate material within the first layer adjacent to the surface of the substrate using a selected one of: implanting ions or laser direct writing.

16. The method of claim 12, wherein the one or more optical waveguides include glass.

17. The method of claim 12, wherein applying the second layer of the substrate onto the surface of the first layer of the substrate further includes depositing the second layer.

18. The method of claim 12, wherein at least two of the one or more optical waveguides are substantially parallel.

19. A package comprising:

a substrate comprising:

a first side and a second side opposite the first side;

a cavity within the substrate extending from the first side of the substrate to the second side of the substrate; and an optical waveguide within the substrate, the optical waveguide between the first side and the second side of the substrate, wherein an end of the optical waveguide is at an edge of the substrate between the first side and the second side adjacent to the cavity, and wherein the optical waveguide has a first thickness at the edge of the substrate, and a second thickness below the edge of the substrate, wherein the first thickness is greater than the second thickness;

an optical connector on the first side of the substrate, the optical connector vertically overlapping with the optical waveguide; and a photonic integrated circuit (PIC) optically coupled with the end of the optical waveguide.

20. The package of claim 19, wherein at least a portion of the PIC is disposed within the cavity of the substrate.

21. The package of claim 20, further including a die electrically coupled with the PIC, wherein at least a portion of the die is disposed within the cavity of the substrate.

22. The package of claim 19, wherein the optical waveguide is a first optical waveguide, and wherein the PIC is a first PIC; and further comprising:

a second optical waveguide within the substrate, the second optical waveguide between the first side of the second side of the substrate, wherein an end of the optical waveguide is at the edge of the substrate between the first side and the second side adjacent to the cavity;

a second PIC optically coupled with the end of the second optical waveguide;

a die electrically coupled with the first PIC and the second PIC; and wherein at least a portion of the first PIC, the second PIC, and the die are disposed within the cavity of the substrate.

23. The package of claim 19, wherein the end of the optical waveguide is a first end; and further comprising a second end of the optical waveguide opposite the first end, the second end is at an edge of the substrate that is not adjacent to the cavity.

24. The package of claim 19, wherein an optical underfill is disposed between a surface of the end of the optical waveguide and the PIC.

* * * * *